(12) United States Patent
Hazama et al.

(10) Patent No.: US 8,839,937 B2
(45) Date of Patent: Sep. 23, 2014

(54) PARKING LOCK DEVICE

(75) Inventors: Shinichiro Hazama, Toyota (JP);
Tatsuya Ishikawa, Anjo (JP)

(73) Assignee: Aisin Seiki Kabushiki Kaisha,
Kariya-Shi, Aichi-Ken (JP)

( * ) Notice: Subject to any disclaimer, the term of this patent is extended or adjusted under 35 U.S.C. 154(b) by 43 days.

(21) Appl. No.: 13/820,953

(22) PCT Filed: Oct. 28, 2011

(86) PCT No.: PCT/JP2011/074920
§ 371 (c)(1),
(2), (4) Date: Mar. 5, 2013

(87) PCT Pub. No.: WO2012/060289
PCT Pub. Date: May 10, 2012

(65) Prior Publication Data
US 2013/0161149 A1    Jun. 27, 2013

(30) Foreign Application Priority Data
Nov. 1, 2010  (JP) ................................. 2010-245373

(51) Int. Cl.
*F16H 63/34* (2006.01)
*B60T 1/06* (2006.01)

(52) U.S. Cl.
USPC ..................................................... 192/219.5

(58) Field of Classification Search
USPC .......................... 192/219.4, 219.5; 74/473.12
See application file for complete search history.

(56) References Cited

U.S. PATENT DOCUMENTS

| 6,481,556 | B1 * | 11/2002 | Haupt ........................ 192/219.5 |
| 7,845,248 | B2 | 12/2010 | Yoshiyama et al. |
| 2012/0067153 | A1 * | 3/2012 | Komatsu et al. ........... 74/473.12 |

FOREIGN PATENT DOCUMENTS

| JP | 2002-349705 A | 12/2002 |
| JP | 2003-130212 A | 5/2003 |
| JP | 2003-185013 A | 7/2003 |
| JP | 2008-002508 A | 1/2008 |
| JP | 2008-039094 A | 2/2008 |
| JP | 2009-047238 A | 3/2009 |
| JP | 2009-162346 A | 7/2009 |

OTHER PUBLICATIONS

International Search Report (PCT/ISA/210) issued on Jan. 24, 2012, by the Japanese Patent Office as the International Searching Authority for International Application No. PCT/JP2011/074920.

* cited by examiner

*Primary Examiner* — Jacob S Scott
(74) *Attorney, Agent, or Firm* — Buchanan Ingersoll & Rooney PC

(57) ABSTRACT

Upon shifting a parking lock device from an unlocked state to a locked state, the power supply to a motor is interrupted when a fitting member reaches a first position of an outer peripheral surface of a position determining plate. At that moment, the rotational energy of a rotation body is absorbed by a rotational energy absorption member. Also, upon shifting the parking lock device from the locked state to the unlocked state, the power supply to the motor is interrupted when the fitting member reaches a second position. At that moment, the rotational energy of the rotation body is absorbed by the rotational energy absorption member as well.

6 Claims, 8 Drawing Sheets

PARKING LOCK DEVICE

FIELD OF THE INVENTION

The present invention relates to a parking lock device.

BACKGROUND OF THE INVENTION

Conventionally, a transmission of a vehicle is provided with a parking lock device. The parking lock device prevents a vehicle from moving unintentionally by engaging a parking gear with a lock pawl, which are arranged inside the transmission, when a shift lever is shifted to a parking range (P range).

In this type of the parking lock device, as disclosed in Patent Document 1, for example, as an actuator (motor) rotates a detent plate via a control rod, an automatic transmission control device and a park rod are simultaneously operated. By driving the actuator, when the automatic transmission control device is shifted to the P range, a conical lock cam provided at the distal end of the park rod displaces the lock pawl to a locked position, at which the lock pawl engages with the parking gear. Thereby, the parking gear engaged with the lock pawl is prevented from being rotated, so that rotation of the output shaft of the automatic transmission is also restricted. At that moment, displacement of the detent plate is determined by a detent spring with a roller to be held in the P range.

PRIOR ART DOCUMENT

Patent Document

Patent Document 1: Japanese Laid-Open Patent Publication No. 2008-39094

SUMMARY OF THE INVENTION

The control rod rotated by the actuator is directly coupled with the detent plate. The detent plate is also directly coupled with the park rod. A lock cam is fixed on the park rod. That is, the position of the control rod, i.e., the rotating position of the motor corresponds to the position of the lock cam that engages with a parking lock pawl.

Accordingly, accuracy of position determination of the control rod by the actuator is required to be high. A highly accurate sensor such as a rotary encoder is used to perform advanced and complicated control such as pulse width modulation (PWM) control and proportional integral differential (PID) control. As a result, the cost of the parking lock device increases.

As one method of avoiding this, a method may be considered in which an actuator motor with less non-driving torque is adopted as the actuator so that accuracy of shifting the range is improved according to the position determination of the detent plate by elastic force of a detent spring. In this case, however, it is necessary to reduce the cogging torque of the actuator motor.

As a solution for eliminating this problem, a motor such as an SR motor or a coreless motor may be employed, which do not generate cogging torque, has been considered. In the solution, however, the cost for the motor is high and thus it is difficult to lower the cost for the parking lock device.

An object of the present invention is to provide a parking lock device at a low cost in which loads applied to component parts thereof are reduced and a parking gear is selectively controlled to be locked and unlocked.

According to an aspect of the present invention a parking lock device for locking or unlocking a parking gear by a lock pawl is provided. The parking lock device includes: a rotation body that positively or negatively rotates according to positive or negative rotation of a motor, a driven lever that engages with the rotation body and pivots according to positive or negative rotation of the rotation body, a position determining plate including an outer peripheral surface, a first receiving portion and a second receiving portion formed in the outer peripheral surface of the position determining plate, a fitting member that is slidably pressed against the outer peripheral surface of the position determining plate to be received by the first receiving portion or the second receiving portion, thereby holding the lock pawl in the locked position or the unlocked position, an engaging member provided on the driven lever, an interrupting portion that interrupts a power supply to the motor when the fitting member reaches the first position or the second position of the position determining plate, an elastic member, and a rotational energy absorption member for absorbing rotational energy of the rotation body when the power supply to the motor is interrupted. The position determining plate pivots in a positive direction or a negative direction according to pivotal motion of the driven lever in a positive direction or a negative direction to selectively guide the lock pawl to a locked position at which the position determining plate engages with the parking gear and an unlocked position at which the position determining plate is disengaged from the parking gear. When the rotation body rotates in the positive direction, the engaging member engages with the rotation body to positively rotate the driven lever, and when the rotation body rotates in the negative direction, the engaging member engages with the rotation body to negatively rotate the driven lever. When the power supply to the motor is interrupted, the elastic member presses the fitting member to pivot the position determining plate, thereby fitting the fitting member into the first receiving portion or the second receiving portion of the position determining plate.

DETAILED DESCRIPTION OF THE PREFERRED EMBODIMENTS

First Embodiment

A parking lock device according to one embodiment of the present invention will now be described with reference to the drawings.

Figure 1:
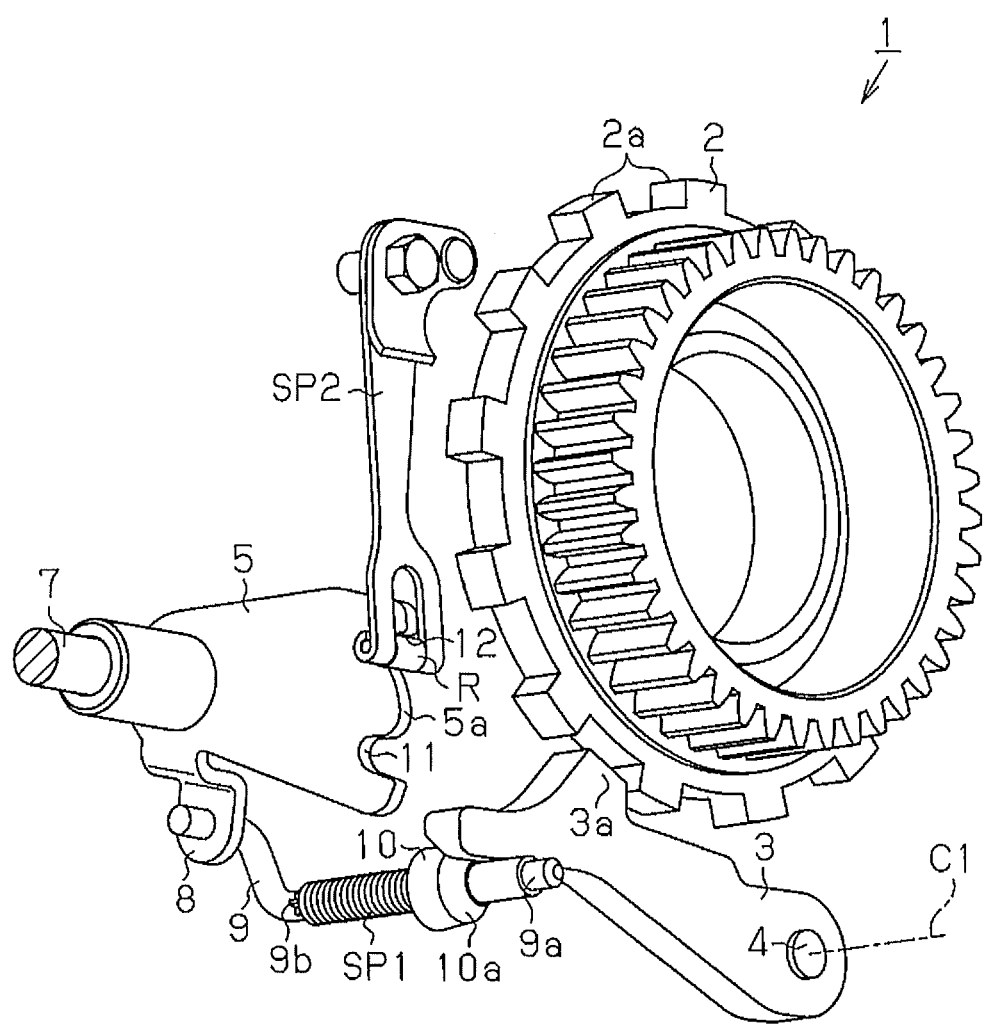
FIG. 1 is a perspective view showing a main section of a parking lock device according to one embodiment of the present invention.

As shown in FIG. 1, a parking lock device 1 has a parking gear 2 and a lock pawl 3 that engages with and releases the parking gear 2. The parking gear 2 and the lock pawl 3 are provided in a housing case (not shown) of a transmission installed on a vehicle.

The parking gear 2 is fixed to the crankshaft (not shown) of an engine supported in the housing case of the transmission and integrally rotates with the crankshaft. Rotation of the parking gear 2 is disabled by engaging a lock claw 3a of the lock pawl 3 with a tooth 2a of the parking gear 2.

The lock pawl 3 is arranged adjacent to the parking gear 2 and is pivotally supported by an intermediate plate (not shown), which is fixed in the housing case of the transmission. A proximal end of the lock pawl 3 is pivotally supported by a support shaft 4 provided in the intermediate plate. The lock pawl 3 is pivotal about a central axis C1 of the support shaft 4.

The lock claw 3a of the lock pawl 3 is formed on a surface that faces the parking gear 2 and at an intermediate part in a longitudinal direction. The lock pawl 3 pivots toward the parking gear 2 to guide the lock claw 3a to a position (hereinafter, referred to as a locked position) at which the lock claw 3a engages with the tooth 2a of the parking gear 2. The lock pawl 3 disables the rotation of the parking gear 2 by guiding the lock claw 3a into the locked position.

The lock pawl 3 pivots in the direction away from the tooth 2a of the parking gear 2 to guide the lock claw 3a to a position (hereinafter, referred to as an unlocked position) at which the lock claw 3a is disengaged from the tooth 2a of the parking gear 2 as shown in FIG. 1. The lock pawl 3 enables the rotation of the parking gear 2 by guiding the lock claw 3a to the unlocked position.

A position determining plate 5 is provided at a position that is adjacent to the lock pawl 3. The position determining plate 5 is substantially an arcuate plate. A proximal end of the position determining plate 5 is fixed to a rotation shaft 7 of a driving device 6 (refer to FIGS. 2 and 3) inserted from the outside of the housing case of the transmission into the casing. The position determining plate 5 is pivoted integrally with the rotation shaft 7 of the driving device 6 according to positive rotation or negative rotation of the rotation shaft 7 of the driving device 6.

A coupling arm 8 is formed in the proximal end of the position determining plate 5. The coupling arm 8 is fixed to a proximal end of a park rod 9 and rotates about a central axis of the rotation shaft 7 with the position determining plate 5 (coupling arm 8). The park rod 9 has a proximal part flexed at two positions thereof in L shapes and a linear rod part 9a. The rod part 9a is formed to extend to a surface of the lock pawl 3 that is opposite to the parking gear 2. The park rod 9 reciprocates in the direction in which the rod part 9a intersects with the lock pawl 3 according to reciprocating rotation of the position determining plate 5.

A coil spring SP1 is installed on the rod part 9a of the park rod 9. The proximal end of the coil spring SP1 engages with a stopper piece 9b formed in the rod part 9a, and the distal end of the coil spring SP1 engages with a control cam 10 that can slide on the rod part 9a.

The control cam 10 is always pressed by the coil spring SP1 toward a distal end of the rod part 9a. The control cam 10 has a tapered conical cam surface 10a. The cam surface 10a slides on the surface of the lock pawl 3 opposite to the parking gear 2. Accordingly, as the rod part 9a of the park rod 9 reciprocates according to the reciprocating pivotal motion of the position determining plate 5, the control cam 10 reciprocates while sliding on the surface opposite to the parking gear 2 of the lock pawl 3. As a result, according to the sliding of the control cam 10, the lock pawl 3 pivots about the central axis C1 of the support shaft 4. That is, the lock pawl 3 pivots between the locked position and the unlocked position by the pivoting of the position determining plate 5.

More specifically, as the position determining plate 5 turns in a counterclockwise direction in FIG. 1, the park rod 9 and the control cam 10 move toward the lock pawl 3. The lock pawl 3 pivots toward the parking gear 2 according to the movement of the control cam 10. Thereby, the lock claw 3a of the lock pawl 3 is guided from the unlocked position to the locked position.

In contrast, as the position determining plate 5 turns in a clockwise direction from the locked position, the park rod 9 and the control cam 10 retract in the direction away from the lock pawl 3. The lock pawl 3 pivots in the direction away from the parking gear 2 according to the movement of the control cam 10. Thereby, the lock claw 3a of the lock pawl 3 is guided from the locked position to the unlocked position.

In the present embodiment, in FIG. 1, the lock pawl 3 is imparted with elastic force in the counterclockwise direction by an elastic member (not shown) to always press the control cam 10.

Figure 4:
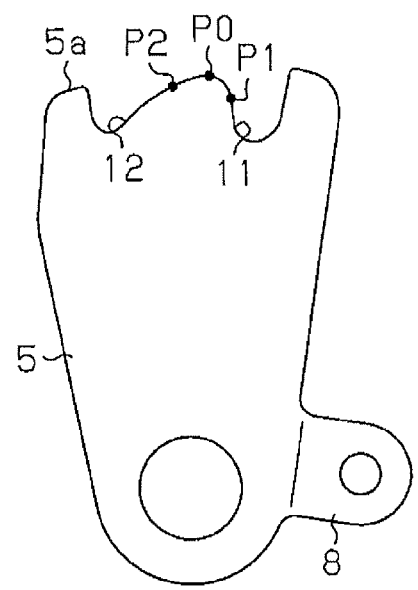
FIG. 4 is a partially cut-away top view showing a position determining plate.

As shown in FIG. 4, a lock holding recess 11 and an unlock holding recess 12 are formed in an outer peripheral surface 5a of the position determining plate 5. The lock holding recess 11 is on one side of the outer peripheral surface 5a of the position determining plate 5 and is formed on the clockwise direction side in FIGS. 1 and 4. The unlock holding recess 12 is on the other side of the outer peripheral surface 5a of the position determining plate 5 and is formed on the counterclockwise direction side in FIGS. 1 and 4.

The outer peripheral surface 5a between the lock holding recess 11 and the unlock holding recess 12 is, as shown in FIG. 4, shaped as an asymmetrical mountain across the lock holding recess 11 and the unlock holding recess 12 in which a top peak P0 is offset to the lock holding recess 11. That is, the outer peripheral surface 5a of the lock holding recess 11 is formed as steep slope with the top peak P0 therebetween and the outer peripheral surface 5a of the unlock holding recess 12 is formed as a gentle slope.

As shown in FIG. 1, a roller R as a fitting member provided in a distal end of a position determining spring SP2 is pressed against the outer peripheral surface 5a of the position determining plate 5. The position determining spring SP2 is configured by a leaf spring. A proximal end of the position determining spring SP2 is fixed to the intermediate plate (not shown). The position determining spring SP2 always presses the roller R provided in the distal end of the position determining spring SP2 to the outer peripheral surface 5a of the position determining plate 5.

When the position determining plate 5 is in the unlocked position shown in FIG. 1, the roller R of the position determining spring SP2 fits into the unlock holding recess 12. When the position determining plate 5 is in the locked position, the roller R of the position determining spring SP2 fits into the lock holding recess 11.

More specifically, when the position determining plate 5 pivots from the unlocked position about the rotation shaft 7 of the driving device 6 in the counterclockwise direction, the roller R of the position determining spring SP2 slides on the outer peripheral surface 5a from the unlock holding recess 12 to the lock holding recess 11. When the position of the roller R is determined at a predetermined first position P1 on a slanted surface shown in FIG. 4 beyond the top peak P0, the roller R pushed against the outer peripheral surface 5a pivots the position determining plate 5 in the counterclockwise direction by a component force of the elastic force of the position determining spring SP2 applied to the outer peripheral surface 5a in the counterclockwise direction. Thereby, the roller R fits into the lock holding recess 11.

When the position determining plate 5 pivots from the locked position about the rotation shaft 7 of the driving device 6 in the clockwise direction, the roller R of the position determining spring SP2 slides on the outer peripheral surface 5a from the lock holding recess 11 to the unlock holding recess 12. When the position of the roller R is determined at a predetermined second position P2 on the slanted surface shown in FIG. 4 beyond the top peak P0, the roller R pivots the position determining plate 5 in the clockwise direction by component force of the elastic force of the position determining spring SP2 applied to the outer peripheral surface 5a in the clockwise direction. Thereby, as shown in FIG. 1, the roller R fits into the unlock holding recess 12.

Figure 2:
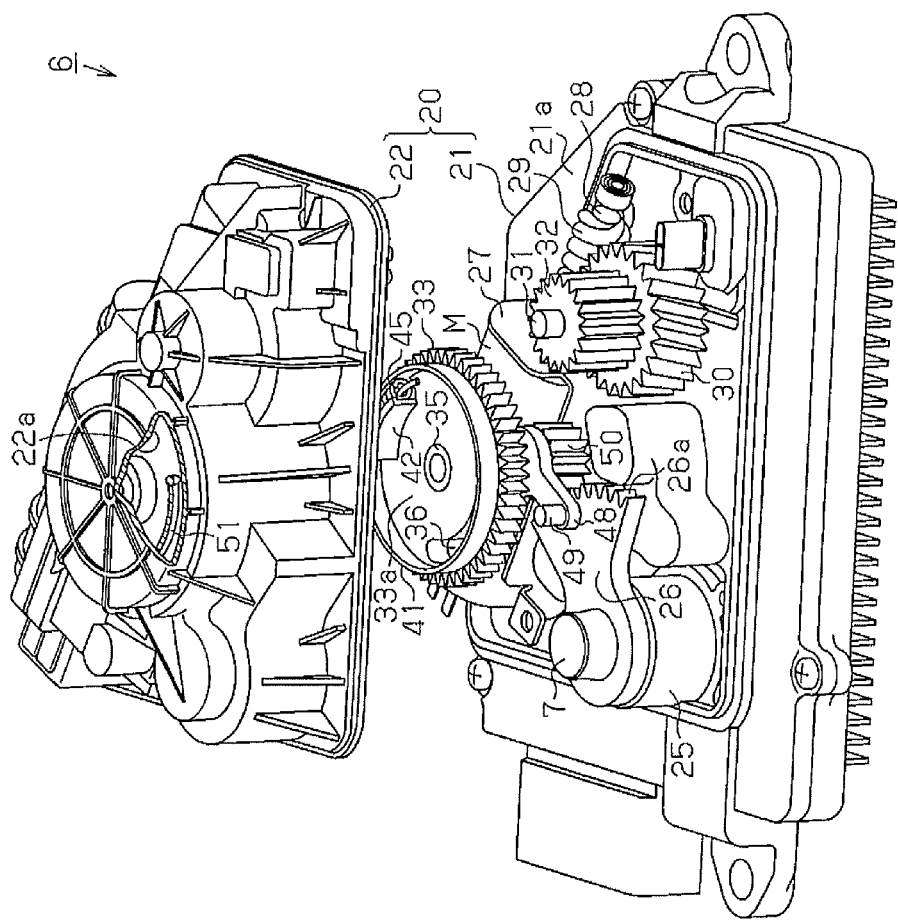
FIG. 2 is an exploded perspective view showing a main section of a driving device of the parking lock device as shown in FIG. 1.
Figure 3:
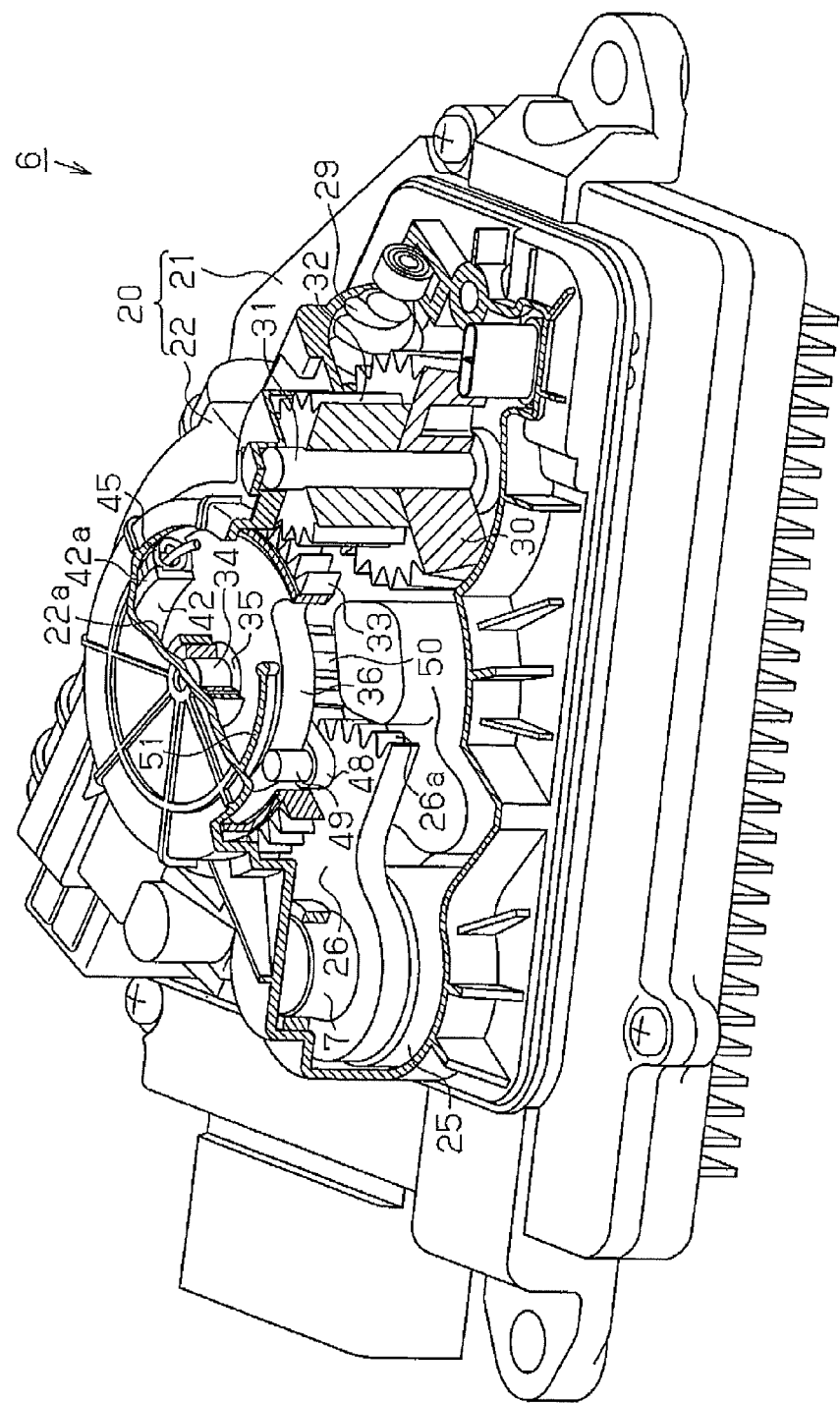
FIG. 3 is a partially cut-away perspective view showing the driving device shown in FIG. 2.

Next, the driving device 6, which pivots the position determining plate 5, will be described with reference to FIGS. 2 and 3. As shown in FIGS. 2 and 3, the driving device 6 is accommodated in a housing case 20 adjacent to the transmission. The housing case 20 is configured by a base plate 21 and a top housing 22.

As shown in FIG. 2, a bearing 25 that rotationally supports the rotation shaft 7 is formed on the base plate 21. The rotation shaft 7 is rotationally supported by the bearing 25, while the movement of the rotation shaft 7 in an axial direction is disabled. Further, the rotation shaft 7 protrudes from the bearing 25. A sector gear 26 is fixed on the proximal end of the rotation shaft 7. Accordingly, the sector gear 26 pivots integrally with the rotation shaft 7 about the central axis of the rotation shaft 7.

A brush motor M is fixed on the base plate 21 by a fixing member 27 along a plate surface 21a. Accordingly, an output shaft 28 of the brush motor M extends in parallel to the plate surface 21a with a certain distance therebetween.

A worm 29 is fixed on the output shaft 28 of the brush motor M. The worm 29 engages with a worm wheel 30 and transmits rotation of the brush motor M to the worm wheel 30. The worm wheel 30 is rotationally supported by a first support shaft 31 provided on the base plate 21 and rotates about a central axis of the first support shaft 31 by rotation of the worm 29 (output shaft 28).

A small gear 32 configured by a spur gear is rotationally supported by the first support shaft 31 so that the small gear 32 integrally rotates with the worm wheel 30. The small gear 32 is connected with the worm wheel 30 and rotates integrally with the worm wheel 30 about the central axis of the first support shaft 31 by the rotation of the worm 29 (output shaft 28).

The small gear 32 engages with a drive gear 33 configured by a spur gear having a greater number of teeth than those of the small gear 32 and rotates the drive gear 33. A second support shaft 34 is provided standing on the base plate 21. The drive gear 33 is supported by a collar 35 that is rotationally installed on the second support shaft 34. More specifically, the drive gear 33 is rotationally supported by the collar 35 and rotates about a central axis of the second support shaft 34 by rotation of the small gear 32.

Figure 5:
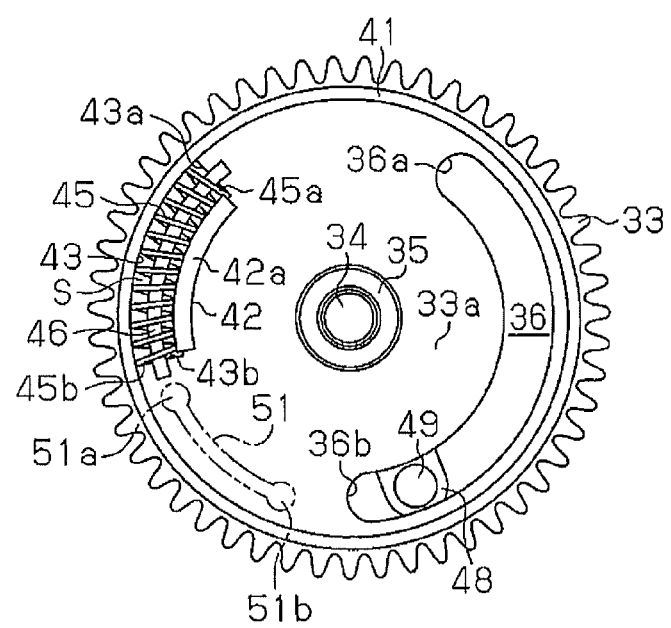
FIG. 5 is a top view showing a drive gear.

As shown in FIG. 5, an arcuate receiving groove 36 is formed through a side 33a of the drive gear 33. Each of the outer periphery and the inner periphery of the receiving groove 36 is shaped as an arc about the central axis of the second support shaft 34.

Also, a cylindrical wall 41 is formed on an outer periphery of the side 33a of the drive gear 33 and an arcuate wall 42 is formed at a position opposite to the cylindrical wall 41 with respect to the central axis of the second support shaft 34. The arcuate wall 42 is provided standing in parallel with the cylindrical wall 41 with a certain distance therebetween. An arcuate accommodation groove 43 is formed in the side 33a between the arcuate wall 42 and the cylindrical wall 41. An accommodation groove 43 forms an accommodation space S.

A coil spring 45 is arranged in the accommodation space S. The coil spring 45 is arcuately arranged along the accommodation groove 43. A retaining member 46 is inserted through the coil spring 45 so that the ends of the retaining member 46 are locked by an open end of the accommodation groove 43.

A retainer portion 42a is formed on the distal end of the arcuate wall 42. Since the coil spring 45 is retained by the retainer portion 42a, the coil spring 45 is prevented from being pulled out of the accommodation groove 43 toward the top housing 22. Also, the coil spring 45 is prevented from being pulled out of the accommodation groove 43 toward the base plate 21 by the retaining member 46 inserted into the coil spring 45. Parts of a first winding end 45a and a second winding end 45b of the coil spring 45 are respectively locked by opposite end edges 43a, 43b of the accommodation groove 43 so that the coil spring 45 is prevented from being pulled out of the accommodation groove 43 in the circumferential direction of the accommodation groove 43.

The radius of curvature of the central axis of the coil spring 45 provided in the arc shape is equal to the radius of curvature of the central line of the receiving groove 36 shaped as an arc viewed from the top housing 22. The coil spring 45 is a compression spring that applies force onto the first winding end 45a and the second winding end 45b of the coil spring 45 in the circumferential direction.

That is, in FIG. 5, as the first winding end 45a of the coil spring 45 located on the clockwise side receives the force in the counterclockwise direction, the coil spring 45 is shrunk in the counterclockwise direction. As the second winding end 45b of the coil spring 45 located on the counterclockwise side receives the force in the clockwise direction, the coil spring 45 is shrunk in the clockwise direction.

As shown in FIG. 2, a driven lever 48 is fixed to a collar 35 that rotationally supports the drive gear 33. The driven lever 48 rotates integrally with the collar 35. An engaging projection 49 is formed at the distal end of the driven lever 48 to protrude toward the drive gear 33. The engaging projection 49 is inserted through the receiving groove 36 formed in the side 33a of the drive gear 33.

Figure 6A:
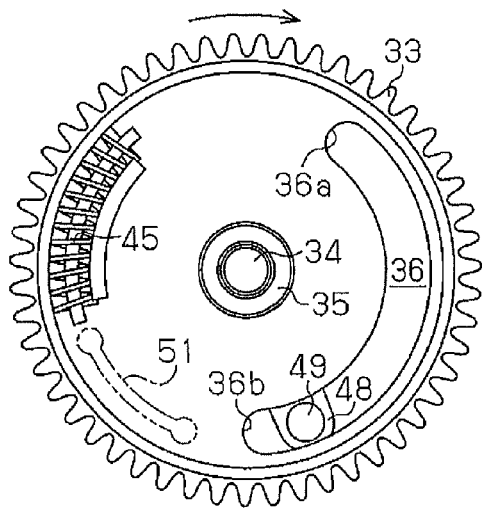
FIG. 6(a) is an explanatory view for illustrating relative positions of the drive gear and an engaging projection when shifted from an unlocked state to a locked state.

When the drive gear 33 is rotated in the clockwise direction in FIG. 6(a) to shift from the unlocked state to the locked state, the drive gear 33 rotates with the engaging projection 49 located in the receiving groove 36. As the engaging projection 49 contacts a first end surface 36a (refer to FIG. 6(b)) located on the counterclockwise side of the receiving groove 36, such a contact causes rotation of the driven lever 48 in the clockwise direction as well as the rotation of the drive gear 33. The pivoting of the driven lever 48 in the clockwise direction causes the collar 35 to rotate in the clockwise direction in FIG. 6.

Figure 7A:
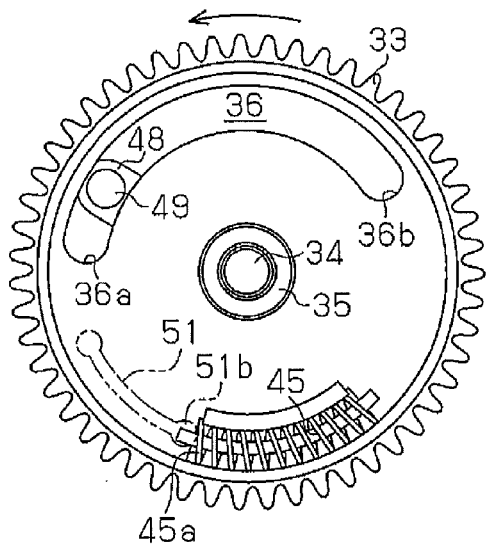
FIG. 7(a) is an explanatory view for illustrating the relative positions of the drive gear and the engaging projection when shifted from the locked state to the unlocked state.

In contrast, when the drive gear 33 rotates in the counterclockwise direction in FIG. 7(a) to shift from the locked state to the unlocked state, the drive gear 33 is rotated with the engaging projection 49 locate in the receiving groove 36. As the engaging projection 49 contacts a second end surface 36b (refer to FIG. 7(b)) of the receiving groove 36 located in the clockwise direction, such a contact causes rotation of the driven lever 48 in the counterclockwise direction as well as the rotation of the drive gear 33. The pivoting of the driven lever 48 in the counterclockwise direction causes the collar 35 to rotate in the counterclockwise direction in FIG. 7.

A driven gear 50 configured by a spur gear is fixed onto the collar 35 and rotates integrally with the driven lever 48. The driven gear 50 engages with a gear part 26a of the sector gear 26. Accordingly, rotation force of the driven lever 48 (driven gear 50) rotated according to the rotation of the drive gear 33 is transmitted to the sector gear 26. As a result, the sector gear 26 rotates integrally with the rotation shaft 7 about the central axis of the rotation shaft 7 to pivot the position determining plate 5.

In the present embodiment, as shown in FIG. 1, when the roller R of the position determining spring SP2 is located at the unlocked position, at which the roller R fits into the unlock holding recess 12 of the position determining plate 5, the engaging projection 49 of the driven lever 48 is arranged with respect to the receiving groove 36 of the drive gear 33 according to a relative positional relationship shown in FIG. 6(a).

Also, when the roller R of the position determining spring SP2 is located at the locked position, at which the roller R fits into the lock holding recess 11 of the position determining plate 5, the engaging projection 49 of the driven lever 48 is arranged with respect to the receiving groove 36 of the drive gear 33 according to a relative positional relationship shown in FIG. 7(a).

Figure 6B:
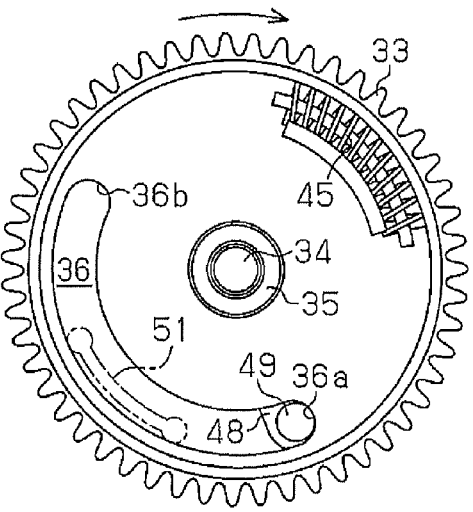
FIG. 6(b) is an explanatory view for illustrating the relative positions of the drive gear and the engaging projection when shifted from the unlocked state to the locked state.

That is, the brush motor M is positively rotated to rotate the drive gear 33 in the clockwise direction in FIG. 6(a) so that the drive gear 33 is rotated with the engaging projection 49 located in the receiving groove 36. As shown in FIG. 6(b), when the first end surface 36a of the receiving groove 36 in the counterclockwise direction contacts the engaging projection 49, such a contact causes the rotation of the driven lever 48 in the clockwise direction as well as the rotation of the drive gear 33. The pivoting of the driven lever 48 in the clockwise direction causes the driven gear 50 to pivot in the clockwise direction as well in FIG. 2.

By pivoting the driven gear 50 in the clockwise direction, the sector gear 26 pivots in the counterclockwise direction to cause the position determining plate 5 to pivot in the counterclockwise direction via the rotation shaft 7. By pivoting the position determining plate 5 in the counterclockwise direction, the roller R of the position determining spring SP2 is out of the unlock holding recess 12 to slide on the outer peripheral surface 5a toward the lock holding recess 11.

Figure 6C:
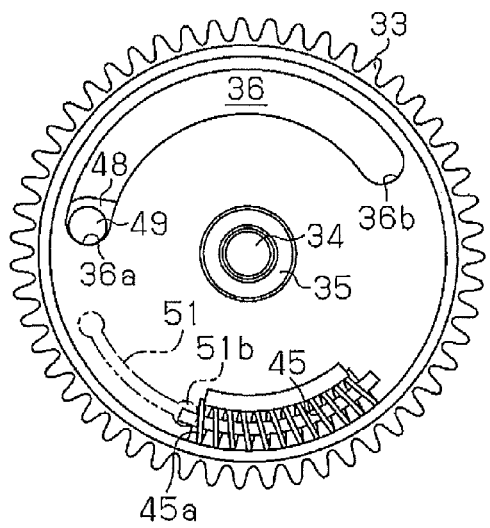
FIG. 6(c) is an explanatory view for illustrating the relative positions of the drive gear and the engaging projection when shifted from the unlocked state to the locked state.

When the engaging projection 49 (driven lever 48) is rotated to a position shown in FIG. 6(c) by the drive gear 33, the roller R reaches the predetermined first position P1 beyond the top peak P0 of the outer peripheral surface 5a of the pivoting position determining plate 5. As the roller R reaches the first position P1, power supply to the brush motor M is interrupted.

When the roller R is located at the first position P1 of the outer peripheral surface 5a, the roller R pivots the position determining plate 5 in the counterclockwise direction by the component force of the elastic force of the position determining spring SP2 in the counterclockwise direction applied to the outer peripheral surface 5a. The roller R fits into the lock holding recess 11.

Figure 6D:
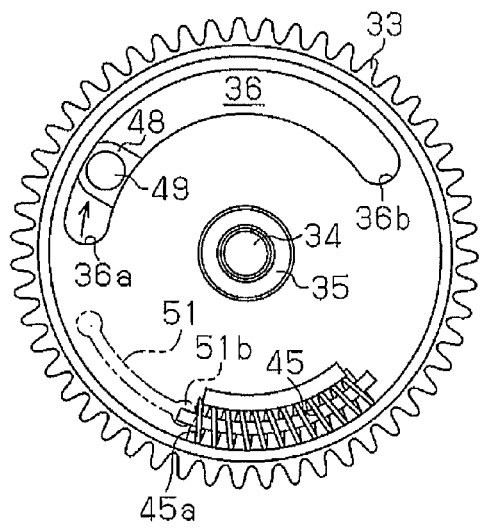
FIG. 6(d) is an explanatory view for illustrating the relative positions of the drive gear and the engaging projection when shifted from the unlocked state to the locked state.

The pivotal motion of the position determining plate 5 in the counterclockwise direction by the elastic force of the spring SP2 is transmitted to the driven gear 50 and the driven lever 48 to cause the driven gear 50 and the driven lever 48 to rotate in the clockwise direction. Thereby, as shown in FIG. 6(d), the engaging projection 49 in contact with the first end surface 36a of the receiving groove 36 leaves the first end surface 36a.

Accordingly, the lock pawl 3 is guided from the unlocked position to the locked position at which the lock claw 3a engages with the tooth 2a of the parking gear 2 to disable the rotation of the parking gear 2.

To rotate the drive gear 33 and the engaging projection 49 from the locked position shown in FIG. 7(a) to the unlocked position, the brush motor M is rotated in reverse. The brush motor M is rotated in reverse to rotate the drive gear 33 in the counterclockwise direction in FIG. 7(a) so that the drive gear 33 is rotated with the engaging projection 49 located in the receiving groove 36.

Figure 7B:
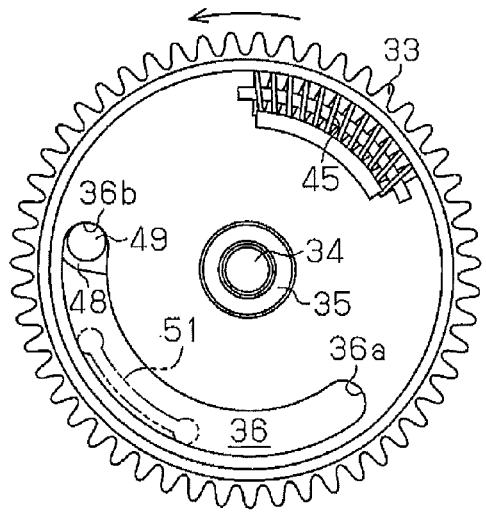
FIG. 7(b) is an explanatory view for illustrating the relative positions of the drive gear and the engaging projection when shifted from the locked state to the unlocked state.

As shown in FIG. 7(b), when the second end surface 36b of the receiving groove 36 in the clockwise direction contacts the engaging projection 49, such a contact causes the rotation of the driven lever 48 in the counterclockwise direction according to the rotation of the drive gear 33. The pivotal motion of the driven lever 48 in the counterclockwise direction causes the driven gear 50 to pivot in the counterclockwise direction as well in FIG. 2.

By rotating the driven gear 50 in the counterclockwise direction, the sector gear 26 pivots in the clockwise direction to cause the position determining plate 5 to pivot in the clockwise direction via the rotation shaft 7. By pivoting the position determining plate 5 in the counterclockwise direction, the roller R of the position determining spring SP2 is out of the lock holding recess 11 to slide on the outer peripheral surface 5a toward the unlock holding recess 12.

Figure 7C:
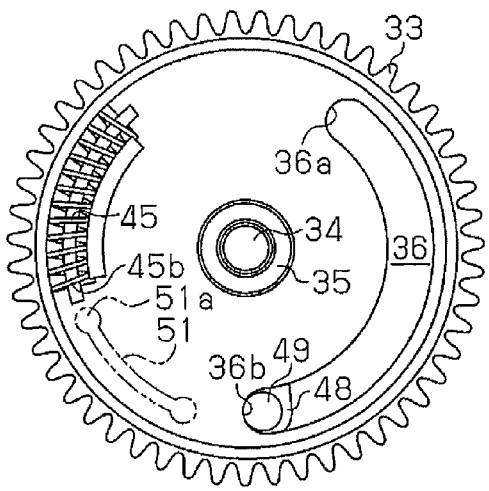
FIG. 7(c) is an explanatory view for illustrating the relative positions of the drive gear and the engaging projection when shifted from the locked state to the unlocked state.

When the engaging projection 49 (driven lever 48) is rotated to a position shown in FIG. 7(c) by the drive gear 33, the roller R reaches the predetermined second position P2 beyond the top peak P0 of the outer peripheral surface 5a of the pivoting position determining plate 5.

As the roller R reaches the predetermined second position P2 beyond the top peak P0, power supply to the brush motor M is interrupted.

When the roller R is beyond the second position P2, the roller R pivots the position determining plate 5 in the clockwise direction by the component force of the elastic force of the position determining spring SP2 in the clockwise direction applied to the outer peripheral surface 5a. Thereby, the roller R fits into the unlock holding recess 12.

The pivotal motion of the position determining plate 5 in the clockwise direction by the elastic force of the spring SP2 is transmitted to the driven gear 50 and the driven lever 48 to cause the driven gear 50 and the driven lever 48 to rotate in the counterclockwise direction. Thereby, as shown in FIG. 7(d), the engaging projection 49 engaged with the second end surface 36b of the receiving groove 36 leaves the second end surface 36b.

Accordingly, the lock pawl 3 is guided from the locked position to the unlocked position at which the lock claw 3a leaves the tooth 2a of the parking gear 2 to enable the rotation of the parking gear 2.

As shown in FIG. 3, a stopper member 51 is formed on an inner surface 22a of the top housing 22 to extend toward the drive gear 33. As shown by a broken line in which a long dash alternates with a pair of short dashes in FIG. 5, the stopper member 51 is an arcuate wall formed to extend in a central axis of the coil spring 45 accommodated in the accommodation space S of the drive gear viewed from the top housing 22. When the drive gear 33 rotates in the clockwise direction to be at the positions shown in FIGS. 6(c) and 6(d), the first winding end 45a on the clockwise side of the coil spring 45 approaches an engaging end 51b on a counterclockwise side of the stopper member 51. That is, as the drive gear 33 reaches the position shown in FIG. 6(c), the coil spring 45 absorbs rotational energy in the clockwise direction by elastic force thereof to restrict further rotation of the engaging projection 49 (driven lever 48) in the clockwise direction.

Figure 7D:
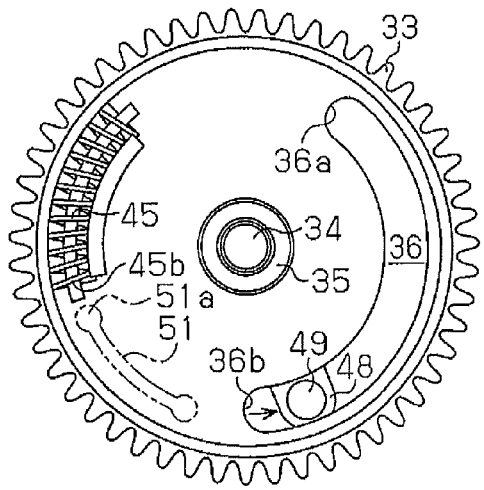
FIG. 7(d) is an explanatory view for illustrating the relative positions of the drive gear and the engaging projection when shifted from the locked state to the unlocked state.
Figure 8:
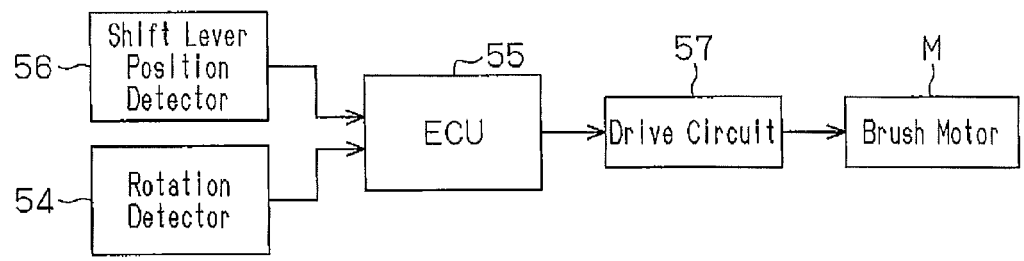
FIG. 8 is a block circuit diagram showing an electric configuration of the driving device shown in FIG. 2.

In contrast, when the drive gear 33 rotates in the counterclockwise direction to be at the positions shown in FIGS. 7(c) and 7(d), the second winding end 45b on the counterclockwise side of the coil spring 45 approaches an engaging end 51a on the clockwise side of the stopper member 51. That is, as the drive gear 33 reaches the position shown in FIG. 7(c), the coil spring 45 absorbs rotational energy in the counterclockwise direction by elastic force thereof to restrict further rotation of the engaging projection 49 (driven lever 48) in the counterclockwise direction.

More specifically, when the engaging projection 49 (driven lever 48) is rotated in the clockwise direction to the position shown in FIG. 6(c) by the drive gear 33, the roller R reaches the predetermined first position P1 beyond the top peak P0 of the outer peripheral surface 5a of the pivoting position determining plate 5. Then, the power supply to the brush motor M is interrupted and the position determining plate 5 is pivoted by the elastic force of the position determining spring SP2. The roller R fits into the lock holding recess 11.

At that moment, if the brush motor M is immediately stopped by interrupting the power supply thereto, problems are not caused. The brush motor M however may rotate through inertia. When the brush motor M rotates through inertia, as shown in FIG. 6(d), the drive gear 33 reengages with the engaging projection 49 (driven lever 48) which the drive gear 33 has once left in the clockwise direction to rotate the engaging projection 49.

At that moment, the position determining plate 5 is located at the locked position at which the roller R fits into the lock holding recess 11 so that further pivotal motion of the position determining plate 5 in the counterclockwise direction is disabled. Accordingly, by rotating the engaging projection 49 (driven lever 48), force is generated to cause the position determining plate 5 to further pivot in the counterclockwise direction. The force is applied to component parts of the parking lock device such as the position determining spring SP2, which supports the roller R fitted in the lock holding recess 11 of the position determining plate 5. This may damage the component parts.

The coil spring 45 engages with the stopper member 51 so that the rotational energy of the drive gear 33 in the counterclockwise direction is absorbed by the elastic force of the coil spring 45. As a result, further pivotal motion of the position determining plate 5 in the counterclockwise direction is restricted to reduce loads on the component parts of the parking lock device such as the position determining spring SP2.

In a similar manner, when the engaging projection 49 (driven lever 48) is rotated in the counterclockwise direction to the position shown in FIG. 7(c) by the drive gear 33, the roller R reaches the predetermined second position P2 beyond the top peak P0 of the outer peripheral surface 5a of the pivoting position determining plate 5. Then, the power supply to the brush motor M is interrupted and the position determining plate 5 is pivoted by the elastic force of the position determining spring SP2. The roller R fits into the unlock holding recess 12.

At that moment, similarly, the brush motor M may rotate through inertia even if the power supply to the brush motor M is interrupted. When the brush motor M rotates through inertia, as shown in FIG. 7(d), the drive gear 33 reengages with the engaging projection 49 (driven lever 48) that has once left the drive gear 33 in the counterclockwise direction. Accordingly, the drive gear 33 rotates the engaging projection 49.

At that moment, the position determining plate 5 is located at the unlocked position, at which the roller R fits into the unlock holding recess 12, so that further pivoting of the position determining plate 5 in the clockwise direction is disabled. Accordingly, by rotating the engaging projection 49 (driven lever 48), force is generated to cause the position determining plate 5 to further pivot in the clockwise direction. The force is applied to the component parts of the parking lock device such as the position determining spring SP2, which supports the roller R fitted in the unlock holding recess 12 of the position determining plate 5. Accordingly, a likelihood of damaging the component parts by the force is considered.

The coil spring 45 engages with the stopper member 51 so that the rotational energy of the drive gear 33 in the clockwise direction is absorbed by the elastic force of the coil spring 45. As a result, further pivoting of the position determining plate 5 in the clockwise direction is restricted to reduce the loads on the component parts of the parking lock device such as the position determining spring SP2.

The coil spring 45 is elastically deformed to absorb the rotational energy of the drive gear 33. Accordingly, the rotational energy of the drive gear 33 is gradually absorbed. Accordingly, in comparison to a case where two locking pieces are engaged with each other to stop the rotation of the drive gear 33, for example, impact is reduced significantly and the rotation of the drive gear 33 is quietly stopped according to the above described configuration.

Next, the electric configuration of the parking lock device that drives and controls the brush motor M will now be described.

A rotation detector 54 is provided in the housing case 20 and detects a rotation position of the rotation shaft 7. The rotation detector 54 detects a rotation position of the position determining plate 5 at each moment, namely, a sliding position of the roller R that slides on the outer peripheral surface 5a of the position determining plate 5 at each moment to supply a detection signal thereof to an electronic control unit (ECU) 55. A shift lever position detector 56 detects each shifting operation position of a shift lever to supply a detection signal thereof to ECU 55.

The ECU 55 has a microcomputer to control the brush motor M via a drive circuit 57. When the ECU 55 detects that the shift lever is shifted from a P range to another shift range on the basis of the detection signal supplied from the shift lever position detector 56, the ECU 55 supplies a positive rotation control signal to positively rotate the brush motor M to the drive circuit 57. The drive circuit 57 positively rotates the brush motor M in response to the positive rotation control signal supplied from the ECU 55.

Also, when the ECU 55 detects that the shift lever has been shifted from a shift range except for the P range to the P range on the basis of the detection signal supplied from the shift lever position detector 56, the ECU 55 supplies a negative rotation control signal to negatively rotate the brush motor M to the drive circuit 57. The drive circuit 57 negatively rotates the brush motor M in response to the negative rotation control signal supplied from the ECU 55.

The ECU 55 detects the sliding position between the roller R and the outer peripheral surface 5a of the position determining plate 5 at each moment and the pivot direction of the position determining plate 5 on the basis of the detection signal supplied from the rotation detector 54. Then, the ECU 55 detects that the position determining plate 5 pivots in the counterclockwise direction so that the roller R passes through the top peak P0 of the outer peripheral surface 5a of the pivoting position determining plate 5 to reach the first position P1 on the basis of the detection signal supplied from the rotation detector 54. When the ECU 55 detects that the roller R reaches the first position P1, the ECU 55 supplies an interruption control signal to the drive circuit 57 to interrupt the power supply to the positively rotating brush motor M. The drive circuit 57 interrupts the power supply to the positively rotating brush motor M in response to the interruption control signal supplied from the ECU 55.

Also, the ECU 55 detects that the position determining plate 5 pivots in the counterclockwise direction so that the roller R passes through the top peak P0 of the outer peripheral surface 5a of the pivoting position determining plate 5 to reach the second position P2 on the basis of the detection signal supplied from the rotation detector 54. As the ECU 55 detects that the roller R reaches the second position P2, the ECU 55 supplies the interruption control signal to the drive circuit 57 to interrupt the power supply to the negatively rotating brush motor M. The drive circuit 57 interrupts the power supply to the negatively rotating brush motor M in response to the interruption control signal supplied from the ECU 55.

The drive circuit 57 of the brush motor M is a publicly-known drive circuit. For example, an H bridge circuit using four power MOS transistors is considered. The ECU 55 controls the four power MOS transistors to be turned ON/OFF accordingly to positively or negatively rotate the brush motor M or interrupt the power supply to the brush motor M.

Next, operations of the parking lock device as configured above will now be described.

(1) From the Unlocked State to the Locked State

When the parking lock device is in the unlocked state, as shown in FIG. 1, the lock pawl 3 is at the unlocked position. Also, the drive gear 33 and the engaging projection 49 of the driven lever 48 are arranged in the relative positions shown in FIG. 6(a). Further, as shown in FIG. 1, the roller R of the position determining spring SP2 is in the state fitted in the unlock holding recess 12 of the position determining plate 5.

(Case in which the Shift Lever is Shifted to the P Range)

As the shift lever is shifted to the P range, the ECU 55 supplies the power to the brush motor M via the drive circuit 57 to positively rotate the brush motor M. According to the positive rotation, the drive gear 33 rotates in the clockwise direction in FIGS. 2 and 6(a). At that moment, the drive gear 33 rotates with the engaging projection 49 of the driven lever 48 located in the receiving groove 36.

(Pivoting of the Position Determining Plate 5 by Rotating the Driven Lever 48)

According to the rotation of the drive gear 33 in the clockwise direction, as shown in FIG. 6 (b), the first end surface 36a of the receiving groove 36 contacts the engaging projection 49 of the driven lever 48. According to the contact, the driven lever 48 is rotated in the clockwise direction against the component force of the elastic force of the position determining spring SP2 in the clockwise direction. As the driven lever 48 pivots in the clockwise direction, the position determining plate 5 is also pivoted in the counterclockwise direction in FIGS. 1 and 6(b).

According to the pivotal motion of the position determining plate 5 in the counterclockwise direction, the park rod 9 and the control cam 10 are moved toward the lock pawl 3. Thereby, the lock claw 3a of the lock pawl 3 is guided from the unlocked position to the locked position.

Further, pivoting the position determining plate 5 in the counterclockwise direction causes the roller R of the position determining spring SP2 to disengage from the unlock holding recess 12 and to slide on the outer peripheral surface 5a toward the lock holding recess 11. Moreover, the ECU 55 begins detection of the sliding position between the roller R and the outer peripheral surface 5a of the position determining plate 5 on the basis of the detection signal supplied from the rotation detector 54.

As the position determining plate 5 pivots such that the roller R reaches the predetermined first position P1 beyond the top peak P0, the ECU 55 supplies the drive circuit 57 with the interruption control signal to interrupt the power supply to the positively rotating brush motor M. Thereby, the power supply to the brush motor M is interrupted so that the brush motor M (drive gear 33) is stopped.

At that moment, as shown in FIG. 6 (c), the drive gear 33 and the driven lever 48 are merely in the state in which the first end surface 36a of the receiving groove 36 is in contact with the engaging projection 49. That is, the drive gear 33 and the driven lever 48 are not directly coupled with each other. Accordingly, the roller R pivots the position determining plate 5 alone in the counterclockwise direction by the component force of the elastic force of the position determining spring SP2 in the counterclockwise direction applied to the outer peripheral surface 5a. By pivoting the position determining plate 5 alone in the counterclockwise direction, the driven lever 48 is pivoted in the clockwise direction.

As the roller R reaches the first position P1 so that the power supply to the brush motor M is interrupted, as shown in FIG. 6(c), the first winding end 45a on the clockwise side of the coil spring 45 provided on the drive gear 33 contacts the engaging end 51b on the counterclockwise side of the stopper member 51. If the brush motor M rotates through inertia so that the drive gear 33 further rotates in the clockwise direction, the engaging end 51b of the stopper member 51 presses the coil spring 45. Accordingly, the rotational energy of the drive gear 33 is absorbed by the elastic force of the coil spring 45 so that the drive gear 33 is stopped. As a result, the engaging projection 49 (driven lever 48) is not further rotated in the clockwise direction.

(Separation of the Engaging Projection 49 from the First End Surface 36a)

According to the pivoting of the position determining plate 5 alone, the roller R fits into the lock holding recess 11. As the roller R fits into the lock holding recess 11, the lock pawl 3 is guided to the locked position. As shown in FIG. 6(d), the engaging projection 49 engaged with the first end surface 36a of the receiving groove 36 leaves the first end surface 36a so that the driven lever 48 is stopped.

(2) From the Locked State to the Unlocked State

When the parking lock device 1 is in the locked state, the lock pawl 3 is at the locked position. The drive gear 33 and the engaging projection 49 of the driven lever 48 are arranged at the relative positions shown in FIGS. 6(d) and 7(a). Further, the roller R of the position determining spring SP2 is in the state fitted in the lock holding recess 11 of the position determining plate 5.

(When the Shift Lever is Shifted to a Range Other than the P Range)

As the shift lever is shifted to a range other than the P range, the ECU 55 supplies the driving power to the brush motor M via the drive circuit 57 to negatively rotate the brush motor M. The driving power is supplied to the brush motor M so that the brush motor M is negatively rotated. According to the negative rotation, the drive gear 33 rotates in the counterclockwise direction in FIG. 7(a). At that moment, the drive gear 33 rotates with the engaging projection 49 of the driven lever 48 located in the receiving groove 36.

(Pivoting of the Position Determining Plate 5 by Rotating the Driven Lever 48)

According to the rotation of the drive gear 33 in the counterclockwise direction, the second end surface 36b of the receiving groove 36 engages with the engaging projection 49 of the driven lever 48. The engagement causes the driven lever 48 to be rotated in the counterclockwise direction against the component force of the elastic force of the position determining spring SP2 in the counterclockwise direction. As the driven lever 48 pivots in the counterclockwise direction, the position determining plate 5 is also pivoted in the clockwise direction in FIG. 1.

According to the pivoting of the position determining plate 5 in the clockwise direction, the park rod 9 and the control cam 10 are moved to be retracted so that the lock claw 3a of the lock pawl 3 is guided from the locked position to the unlocked position.

Further, pivoting the position determining plate 5 in the clockwise direction causes the roller R of the position determining spring SP2 to disengage from the lock holding recess 11 and to slide on the outer peripheral surface 5a toward the unlock holding recess 12. Moreover, the ECU 55 begins detection of the sliding position between the roller R and the outer peripheral surface 5a of the position determining plate 5 on the basis of the detection signal supplied from the rotation detector 54.

As the position determining plate 5 pivots such that the roller R reaches the predetermined second position P2 beyond the top peak P0, the ECU 55 supplies the drive circuit 57 with the interruption control signal to interrupt the power supply to the negatively rotating brush motor M. Thereby, the brush motor M (drive gear 33) is stopped.

At that moment, as shown in FIG. 7(c), the drive gear 33 and the driven lever 48 are not directly coupled with each other. That is, they are merely in the state in which the second end surface 36b of the receiving groove 36 is engaged with the engaging projection 49. Accordingly, the roller R pivots the position determining plate 5 alone in the clockwise direction by the component force of the elastic force of the position determining spring SP2 in the clockwise direction applied to the outer peripheral surface 5a. By pivoting the position determining plate 5 alone in the clockwise direction, the driven lever 48 is pivoted in the counterclockwise direction.

As the roller R reaches the second position P2 so that the power supply to the brush motor M is interrupted, as shown in FIG. 7(c), the second winding end 45b on the counterclockwise side of the coil spring 45 provided on the drive gear 33 contacts the engaging end 51a on the clockwise side of the stopper member 51. If the brush motor M rotates through inertia so that the drive gear 33 further rotates in the counterclockwise direction, the engaging end 51a of the stopper member 51 presses the coil spring 45. Accordingly, the rotational energy of drive gear 33 is absorbed by the elastic force of the coil spring 45 so that the drive gear 33 is stopped. As a result, the engaging projection 49 (driven lever 48) is not further rotated in the counterclockwise direction.

(Separation of the Engaging Projection 49 from the Second End Surface 36b)

According to the pivoting of the position determining plate 5 alone, the roller R fits into the unlock holding recess 12. As the roller R fits into the unlock holding recess 12, as shown in FIG. 1, the lock pawl 3 is guided to the unlocked position. As shown in FIG. 7(d), the engaging projection 49 engaged with the second end surface 36b of the receiving groove 36 leaves the second end surface 36b so that the driven lever 48 is stopped.

Next, advantages obtained by the embodiments configured as described above will be described below.

(1) When the parking lock device 1 shifts from the unlocked state to the locked state, the roller R reaches the first position P1 and the power supply to the brush motor M is interrupted. At that moment, as shown in FIG. 6(c), the first winding end 45a on the clockwise side of the coil spring 45 provided on the drive gear 33 contacts the engaging end 51b of the stopper member 51 in the counterclockwise direction.

Accordingly, even if the brush motor M is rotated through inertia so that the drive gear 33 is further rotated in the clockwise direction, the rotational energy of the drive gear 33 is absorbed by the elastic force of the coil spring 45 so that the engaging projection 49 (driven lever 48) is prevented from being further rotated in the clockwise direction.

Thereby, according to the rotation of the engaging projection 49 to cause the position determining plate 5 to further pivot in the counterclockwise direction, heavy loads are prevented from being applied to the component parts of the parking lock device 1 such as the position determining spring SP2 that supports the roller R fitted into the lock holding recess 11 of the position determining plate 5.

(2) When shifting from the locked state to the unlocked state, the roller R reaches the second position P2 and the power supply to the brush motor M is interrupted. At that moment, as shown in FIG. 7(c), the second winding end 45b on the counterclockwise side of the coil spring 45 provided on the drive gear 33 contacts the engaging end 51a of the stopper member 51 in the clockwise direction.

Accordingly, even if the brush motor M rotates through inertia so that the drive gear 33 further rotates in the counterclockwise direction, the rotational energy of the drive gear 33 is absorbed by the elastic force of the coil spring 45 to prevent the engaging projection 49 (driven lever 48) from being further rotated in the counterclockwise direction.

Accordingly, by rotating the driven lever 48 to cause the position determining plate 5 to further pivot in the clockwise direction, heavy loads are prevented from being applied to the component parts of the parking lock device 1 such as the position determining spring SP2 that supports the roller R fitted in the unlock holding recess 12 of the position determining plate 5.

(3) The coil spring 45 is used as a rotational energy absorption member that absorbs the rotational energy of the drive gear 33. By elastically deforming the coil spring 45, the rotational energy of the drive gear 33 is gradually absorbed. Thereby, the rotation of the drive gear 33 is quietly stopped with a significantly reduced impact.

(4) When the lock pawl 3 is guided from the unlocked position to the locked position, it is not necessary to control the rotation of the brush motor M until the roller R fits into the lock holding recess 11 of the position determining plate 5.

That is, the rotation detector 54 and the ECU 55 detect that the position determining plate 5 is rotated together with the drive gear 33 (driven lever 48) so that the roller R is arranged at the first position P1 beyond the top peak P0 of the outer peripheral surface 5a to interrupt the power supply to the brush motor M to stop the brush motor M. Thereafter, the roller R pivots the position determining plate 5 alone in the counterclockwise direction by the component force of the elastic force of the position determining spring SP2 in the counterclockwise direction applied to the outer peripheral surface 5a until the roller R fits into the lock holding recess 11. That is, the position determination of the position determining plate 5 depends on the position determining spring SP2 and the position determining plate 5.

Accordingly, high accuracy of the position determination of the position determining plate 5 with respect to the roller R by the brush motor M is not required. That is, it is only necessary for the rotation detector 54 and the ECU 55 to detect that the roller R reaches the first position P1 beyond the top peak P0 of the outer peripheral surface 5a of the position determining plate 5 to interrupt the power supply to the brush motor M.

As a result, it is not necessary to perform advanced and complicated motor control such as PWM control and PID control. Accordingly, the parking lock device is provided at a low cost.

(5) When the lock pawl 3 is guided from the locked position to the unlocked position, it is not necessary to control the rotation of the brush motor M until the roller R fits into the unlock holding recess 12 of the position determining plate 5.

That is, the rotation detector 54 and the ECU 55 detect that the position determining plate 5 is rotated together with the drive gear 33 (driven lever 48) so that the roller R is arranged at the second position P2 beyond the top peak P0 of the outer peripheral surface 5a to interrupt the power supply to the brush motor M to stop the brush motor M. Thereafter, the roller R pivots the position determining plate 5 alone in the clockwise direction by the component force of the elastic force of the position determining spring SP2 in the clockwise direction applied to the outer peripheral surface 5a until the roller R fits into the unlock holding recess 12. That is, the position determination of the position determining plate 5 depends on the position determining spring SP2 and the position determining plate 5.

Accordingly, high accuracy of the position determination of the position determining plate 5 with respect to the roller R by the brush motor M is not required. That is, it is only necessary for the rotation detector 54 and the ECU 55 to detect that the roller R reaches the predetermined second position P2 beyond the top peak P0 of the outer peripheral surface 5a of the position determining plate 5 to interrupt the power supply to the brush motor M.

As a result, it is not necessary to perform advanced and complicated motor control such as PWM control and PID control. Accordingly, the parking lock device is provided at a low cost.

(6) By providing the driven lever 48 rotated integrally with the position determining plate 5, the driven lever 48 and the drive gear 33 are rotated relative to each other. As for the driven lever 48 and the drive gear 33, as the drive gear 33 rotates with respect to the driven lever 48 by a certain amount in one direction, the driven lever 48 is rotated in the one direction. As the drive gear 33 rotates with respect to the driven lever 48 by a certain amount in the other direction, the driven lever 48 is rotated in the other direction.

That is, since the drive gear 33 (brush motor M) and the driven lever 48 (position determining plate 5) are not directly coupled with each other, the brush motor M at a low cost is adopted without being restricted to a required non-drive torque value of an actuator motor that pivots the position determining plate 5.

Second Embodiment

Next, a parking lock device according to a second embodiment of the present invention will now be described with reference to the drawings. The parking lock device in the first embodiment includes a configuration that when the power supply to the brush motor M is interrupted, the coil spring 45 and the stopper member 51 prevent the drive gear 33 from being further rotated due to the rotation of the brush motor M through inertia. The configuration to prevent the drive gear 33 from being further rotated in the present embodiment differs from that of the first embodiment. Accordingly, the following description will discuss the differences from the first embodiment and omits the details that are common with the corresponding portions of the first embodiment for simplicity.

Figure 9:
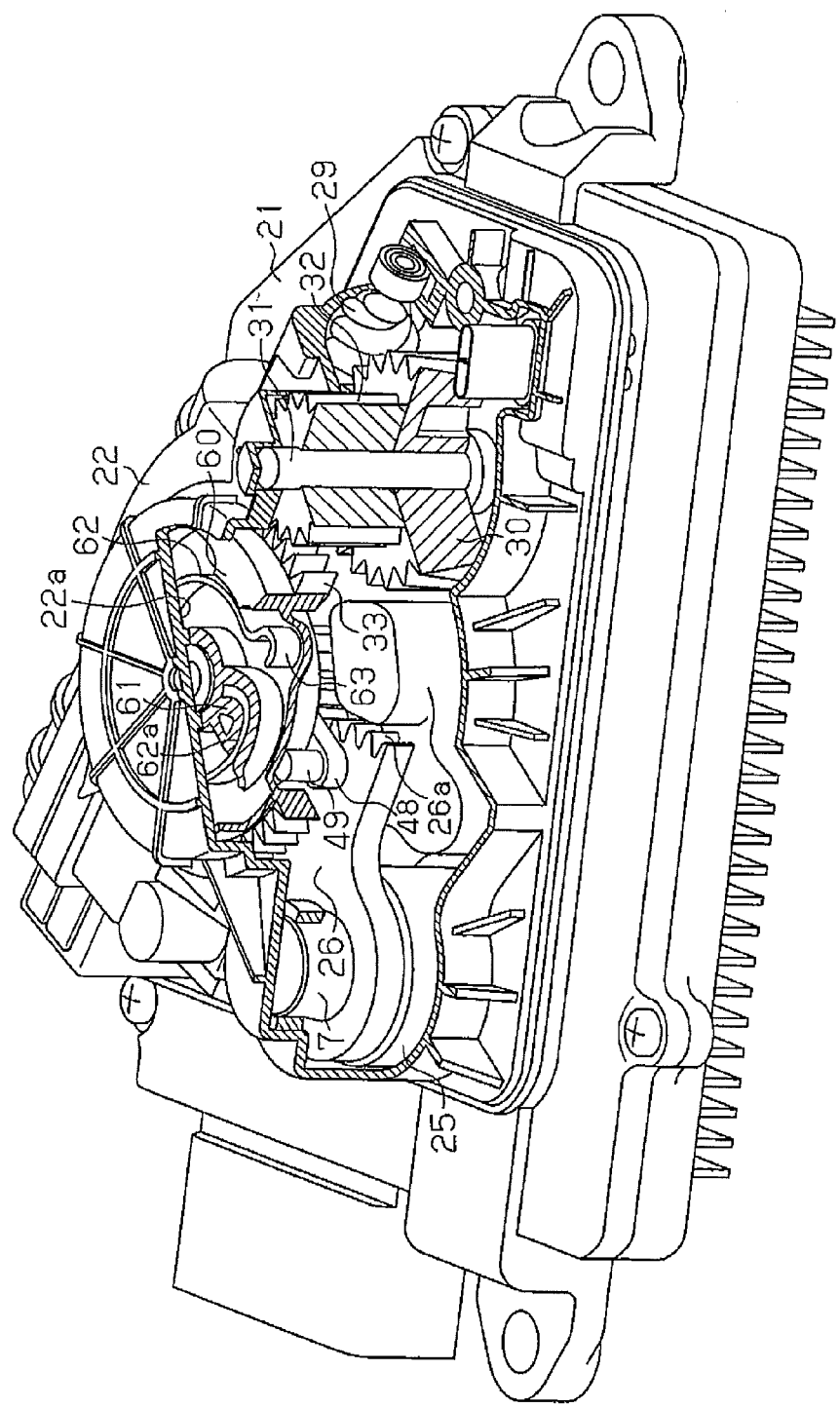
FIG. 9 is an exploded perspective view showing the main section of a driving device of a parking lock device according to another embodiment.
Figure 10:
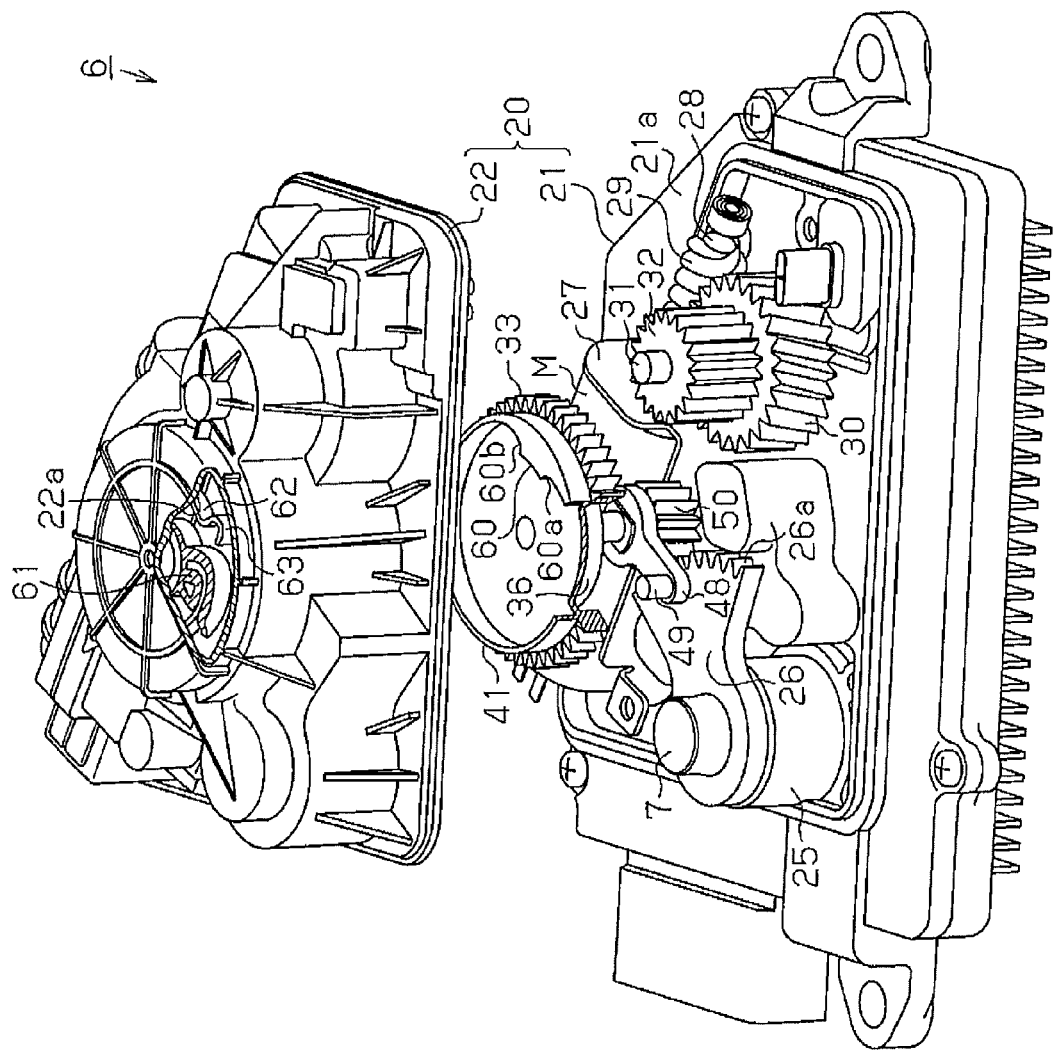
FIG. 10 is a partially cut-away perspective view showing the driving device as shown in FIG. 9.

In FIGS. 9 and 10, a moveable cam 60 is formed on an inner peripheral surface of the cylindrical wall 41 formed on the drive gear 33. The moveable cam 60 is shaped as a mountain with opposite lateral surfaces as arcuate inclined cam surfaces 60a and 60b. As the drive gear 33 rotates, the moveable cam 60 is rotated about the central axis of the second support shaft 34 integrally with the drive gear 33.

As shown in FIG. 9, a clamp member 61 that extends toward the drive gear 33 is formed on the inner surface 22a of the top housing 22. The clamp member 61 clamps and fixes a proximal end 62a of a spiral torsion spring 62. The spiral torsion spring 62 is formed so that it is spiral and externally curved in the clockwise direction. A contact end 63 shaped as a semicircular arc is formed on a distal end of the spiral torsion spring 62.

A relative positional relationship between the contact end 63 of the spiral torsion spring 62 and the rotating moveable cam 60 is set in advance. According to the present embodiment, as shown in FIG. 10, the spiral torsion spring 62 is rotated by the drive gear 33 that rotates in the clockwise direction. As the roller R reaches the first position P1 of the outer peripheral surface 5a of the position determining plate 5, the contact end 63 of the spiral torsion spring 62 contacts the inclined cam surface 60a located on the clockwise side of the moveable cam 60.

That is, when the roller R reaches the first position P1 to interrupt the power supply to the brush motor M to shift from the unlocked state to the locked state, the contact end 63 of the spiral torsion spring 62 contacts the inclined cam surface 60a on the clockwise side of the moveable cam 60. If the brush motor M rotates through inertia so that the drive gear 33 further rotates in the clockwise direction, the contact end 63 of the spiral torsion spring 62 further contacts the inclined cam surface 60a of the moveable cam 60. At that moment, the spiral torsion spring 62 is elastically deformed to absorb the rotational energy of the drive gear 33.

In contrast, as the spiral torsion spring 62 is rotated by the drive gear 33 that rotates in the counterclockwise direction and the roller R reaches the second position P2 of the outer peripheral surface 5a of the position determining plate 5, the contact end 63 of the spiral torsion spring 62 contacts the inclined cam surface 60b located on the counterclockwise side of the moveable cam 60.

That is, when the roller R reaches the second position P2 to interrupt the power supply to the brush motor M to shift from the locked state to the unlocked state, the contact end 63 of the spiral torsion spring 62 contacts the inclined cam surface 60b on the counterclockwise side of the moveable cam 60. If the brush motor M rotates through inertia so that the drive gear 33 further rotates in the counterclockwise direction, the contact end 63 of the spiral torsion spring 62 further contacts the inclined cam surface 60b of the moveable cam 60. At that moment, the spiral torsion spring 62 is elastically deformed to absorb the rotational energy of the drive gear 33.

According to the second embodiment as described in detail above, the following advantages are obtained in addition to the above described advantages (3) to (6) obtained by the first embodiment.

(7) When the parking lock device 1 shifts from the unlocked state to the locked state, the roller R reaches the first position P1 and the power supply to the brush motor M is interrupted. At that moment, the contact end 63 of the spiral torsion spring 62 provided in the top housing 22 contacts the inclined cam surface 60a of the moveable cam 60 in the clockwise direction provided on the drive gear 33.

Accordingly, if the brush motor M rotates through inertia so that the drive gear 33 is further rotated in the clockwise direction, the rotational energy of the drive gear 33 is absorbed by the elastic force of the spiral torsion spring 62 so that the engaging projection 49 (driven lever 48) is prevented from being further rotated in the clockwise direction.

Accordingly, the driven lever 48 is rotated such that the position determining plate 5 is further pivoted in the counterclockwise direction and thus heavy loads are prevented from being applied to the component parts of the parking lock device 1 such as the position determining spring SP2, which supports the roller R fitted into the lock holding recess 11 of the position determining plate 5.

(8) When shifting from the locked state to the unlocked state, the roller R reaches the second position P2 and the power supply to the brush motor M is interrupted. At that moment, the contact end 63 of the spiral torsion spring 62 provided in the top housing 22 contacts the inclined cam surface 60b on the counterclockwise side of the moveable cam 60 provided on the drive gear 33.

Accordingly, if the brush motor M rotates through inertia so that the drive gear 33 is further rotated in the counterclockwise direction, the rotational energy of the drive gear 33 is absorbed by the elastic force of the spiral torsion spring 62. This prevents the engaging projection 49 (driven lever 48) from being further rotated in the counterclockwise direction.

Accordingly, the driven lever 48 is rotated such that the position determining plate 5 is further pivoted in the clockwise direction and thus heavy loads are prevented from being applied to the component parts of the parking lock device 1 such as the position determining spring SP2, which supports the roller R fitted in the lock holding recess 11 of the position determining plate 5.

The above described embodiments may be modified as follows.

As an alternative to the rotation detector 54 and the ECU 55 used for detecting the relative positions of the position determining plate 5 and the roller R to interrupt the power supply to the brush motor M, for example, a contact end may be provided on the driven lever 48. When the roller R is arranged at the first position P1 and the second position P2 of the outer peripheral surface 5a of the position determining plate 5, respectively, the contact end turns a first limit switch and a second limit switch on correspondingly to interrupt the power supply to the brush motor M.

The drive circuit of the brush motor M is not limited to the H bridge circuit. Any drive circuits that can positively or negatively rotate the brush motor M may be used. As an alternative to the power MOS transistors, a motor drive circuit using bipolar transistors may be used.

The position determining spring SP2 may be embodied by, for example, a coil spring as an alternative to the leaf spring. In this case, the roller R is attached to the distal end of the coil spring so that the roller R presses the outer peripheral surface 5a of the position determining plate 5 by elastic force of the coil spring.

The brush motor M is used for rotating the drive gear 33. Any motors other than the brush motor M may be used as long as they can positively or negatively rotate.

As an alternative to the receiving groove 36 in the drive gear 33, a receiving groove may be formed in a rotation body such as a circular disc that can rotate integrally with the drive gear 33 so that the engaging projection 49 of the driven lever 48 can fit into the receiving groove of the rotation body such as the circular disc.

The invention claimed is:

1. A parking lock device for locking or unlocking a parking gear by a lock pawl, the device comprising:
   a rotation body that positively or negatively rotates according to positive or negative rotation of a motor;
   a driven lever that engages with the rotation body and pivots according to positive or negative rotation of the rotation body;
   a position determining plate including an outer peripheral surface, wherein the position determining plate pivots in a positive direction or a negative direction according to pivotal motion of the driven lever in a positive direction or a negative direction to selectively guide the lock pawl to a locked position at which the lock pawl engages with the parking gear and an unlocked position at which the lock pawl is disengaged from the parking gear;
   a first receiving portion and a second receiving portion formed in the outer peripheral surface of the position determining plate;
   a fitting member that is slidably pressed against the outer peripheral surface of the position determining plate to be received by the first receiving portion or the second receiving portion, thereby holding the lock pawl in the locked position or the unlocked position;
   an engaging member provided on the driven lever, wherein, when the rotation body rotates in the positive direction, the engaging member engages with the rotation body to positively rotate the driven lever, and when the rotation body rotates in the negative direction, the engaging member engages with the rotation body to negatively rotate the driven lever;
   an interrupting portion that interrupts a power supply to the motor when the fitting member reaches a first position or a second position of the position determining plate;
   an elastic member, wherein, when the power supply to the motor is interrupted, the elastic member presses the fitting member to pivot the position determining plate, thereby fitting the fitting member into the first receiving portion or the second receiving portion of the position determining plate; and
   a rotational energy absorption member for absorbing rotational energy of the rotation body when the power supply to the motor is interrupted.

2. The parking lock device according to claim 1, wherein the rotation body includes a drive gear,
an arcuate receiving groove that extends in a circumferential direction of the drive gear is formed on a side of the drive gear,
the engaging member of the driven lever is inserted into the receiving groove so that the engaging member is movable in the circumferential direction, and
a first engaging portion and a second engaging portion are respectively provided on inner surfaces of opposite ends of the receiving groove in the circumferential direction so that the engaging member contacts the first engaging portion or the second engaging portion according to the positive rotation or the negative rotation of the rotation body.

3. The parking lock device according to claim 1, wherein the elastic member includes a position determining spring, wherein the fitting member is on a distal end of the position determining spring, and the position determining spring always presses the outer peripheral surface of the position determining plate by elastic force thereof via the fitting member,
when the position determining plate is pivoted in a first pivot direction to the first position, the elastic member pivots the position determining plate in the first pivot direction by a pressing force to fit the fitting member into the first receiving portion, and
when the position determining plate is pivoted in a second pivot direction, which is opposite to the first pivot direction, to the second position, the elastic member pivots the position determining plate in the second pivot direction by the pressing force to fit the fitting member into the second receiving portion.

4. The parking lock device according to claim 1, further comprising a housing case that covers the rotation body, wherein
the rotational energy absorption member is formed by a coil spring and a stopper member,
the coil spring has a first engaging end and a second engaging end at opposite ends thereof, respectively,
one of the coil spring and the stopper member is provided on the rotation body,
the other one of the coil spring and the stopper member is provided in the housing case, and
when the fitting member reaches the first position or the second position of the position determining plate, the stopper member is arranged in a position proximate to the first engaging end or the second engaging end of the coil spring.

5. The parking lock device according to claim 4, wherein
the coil spring is provided on the rotation body and rotates according to the rotation of the rotation body, and
the stopper member is provided in the housing case and arranged on a rotation path of the coil spring.

6. The parking lock device according to claim 1, further comprising a housing case that covers the rotation body, wherein
the rotational energy absorption member includes:
a cylindrical wall provided on an outer periphery of the rotation body,
a moveable cam formed on an inner peripheral surface of the cylindrical wall, the moveable cam rotating integrally with the rotation body,
a first inclined cam surface and a second inclined cam surface formed on the moveable cam,
a spiral torsion spring provided in the housing case, the spiral torsion spring being formed to be spirally curved from a central position of the housing case to the cylindrical wall, and
a contact end provided on a distal end of the spiral torsion spring, and
when the fitting member reaches the first position or the second position of the position determining plate, the contact end of the spiral torsion spring contacts the first inclined cam surface or the second inclined cam surface of the moveable cam.

* * * * *